(12) United States Patent
Fuwa et al.

(10) Patent No.: US 9,685,893 B2
(45) Date of Patent: Jun. 20, 2017

(54) ALTERNATING CURRENT GENERATION SYSTEM ACCOMPANYING POWER CONVERSION

(71) Applicants: DENSO CORPORATION, Kariya, Aichi-pref. (JP); DENSOTRIM CO., LTD., Mie-gun, Mie-pref. (JP)

(72) Inventors: Yasuhiro Fuwa, Nagoya (JP); Kanechiyo Terada, Handa (JP); Osamu Naitou, Kariya (JP); Kouichi Nagata, Kariya (JP); Masaaki Ohno, Yokkaichi (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/646,941

(22) PCT Filed: Nov. 19, 2013

(86) PCT No.: PCT/JP2013/081109
§ 371 (c)(1),
(2) Date: May 22, 2015

(87) PCT Pub. No.: WO2014/080882
PCT Pub. Date: May 30, 2014

(65) Prior Publication Data
US 2015/0303843 A1    Oct. 22, 2015

(30) Foreign Application Priority Data

Nov. 22, 2012 (JP) .................................. 2012-256886

(51) Int. Cl.
*H02P 9/04* (2006.01)
*H02P 9/44* (2006.01)
(Continued)

(52) U.S. Cl.
CPC ................ *H02P 6/142* (2013.01); *H02P 6/16* (2013.01); *H02P 6/182* (2013.01); *H02P 9/48* (2013.01)

(58) Field of Classification Search
CPC ................. H02P 9/44; H02P 9/04; H02P 9/48
(Continued)

(56) References Cited

U.S. PATENT DOCUMENTS 5,663,631 A    9/1997    Kajiura et al.
6,049,194 A    4/2000    Nakagawa et al.
(Continued)

FOREIGN PATENT DOCUMENTS

JP    08-214470    8/1996
JP    10-262343    9/1998
(Continued)

OTHER PUBLICATIONS

English translation of International Search Report dated Jan. 21, 2014 issued in PCT/JP2013/081109 (1 page).
International Preliminary Report on Patentability (4 pages) mailed Jun. 4, 2015, issued in corresponding Japanese Application No. PCT/JP2013/081109 and English translation (8 pages).

*Primary Examiner* — Bentsu Ro
(74) *Attorney, Agent, or Firm* — Nixon & Vanderhye P.C.

(57) ABSTRACT

An alternating current generation system is provided. In the system, in a rotor, a plurality of detection subject portions are arrayed along a circumferential direction in correspondence to reversal states of the magnetic poles in a plurality of magnetized portions. A detecting unit is disposed opposing the rotor so as to generate an output signal corresponding to passage state of the detection subject portions. A phase control unit outputs, to a power converter, a control signal to perform phase control of switching elements depending on the rotation phase of the rotor, based on the output signal from the detecting unit.

18 Claims, 10 Drawing Sheets

(51) Int. Cl.
    *H02P 9/48*        (2006.01)
    *H02P 6/14*        (2016.01)
    *H02P 6/182*      (2016.01)
    *H02P 6/16*        (2016.01)

(58) Field of Classification Search
    USPC ........................................ 322/20, 28; 363/40
    See application file for complete search history.

(56) References Cited

U.S. PATENT DOCUMENTS

| | | | |
|---|---|---|---|
| 7,253,590 B2 * | 8/2007 | Suzuki | H02P 9/48 322/20 |
| 2001/0045786 A1 | 11/2001 | Sekine | |
| 2004/0085047 A1 | 5/2004 | Suzuki et al. | |
| 2010/0319666 A1 * | 12/2010 | Usukura | F02P 11/02 123/631 |

FOREIGN PATENT DOCUMENTS

| | | |
|---|---|---|
| JP | 11-046456 | 2/1999 |
| JP | 11-355989 | 12/1999 |
| JP | 2004-140927 | 5/2004 |
| JP | 2004-173482 | 6/2004 |
| JP | 2009-232650 | 10/2009 |
| JP | 2012-039697 | 2/2012 |

\* cited by examiner

ALTERNATING CURRENT GENERATION SYSTEM ACCOMPANYING POWER CONVERSION

This application is the U.S. national phase of International Application No. PCT/JP2013/081109 filed 19 Nov. 2013 which designated the U.S. and claims priority to JP Patent Application No. 2012-256886 filed 22 Nov. 2012, the entire contents of each of which are hereby incorporated by reference.

TECHNICAL FIELD

The present invention relates to an alternating current generation system. In particular, the present invention relates to an alternating current generation system that uses switching elements capable of being electrically turned ON and OFF and that performs power conversion.

BACKGROUND ART

Although there are various types of alternating current generation systems, among these types, there is an alternating current generation system that performs so-called "phase control". This alternating current generation system is known, for example, through PTL 1.

This type of alternating current generation system includes a power converter that has a plurality of switching elements, the quantity thereof corresponding to the number of phases of an alternating current generator, and a rotation phase detecting means for detecting the rotation phase of a rotor. The alternating current generation system is configured to achieve a desired output by controlling the drive timing of the switching elements, or in other words, the phase, based on the detected rotation phase.

CITATION LIST

Patent Literature

[PTL 1] JP-A-H08-214470

Technical Problem

To favorably perform phase control such as that described above, the above-described rotation phase detecting means is required to detect the rotation phase of the rotor. In a conventional apparatus of this type, in general, magnetic sensors for rotor phase (magnetic pole reversal position) detection composed of Hall elements or the like are provided, the quantity thereof amounting to at least the number of phases. In a configuration such as this, apparatus cost increases. In addition, when the alternating current generation system is mounted in a vehicle (in particular, a motorcycle) in a mode in which the rotor is housed within an engine and directly connected to a crank shaft, it may be difficult to provide the number of magnetic sensors for rotor phase (magnetic pole reversal position) detection amounting to the number of phases for reasons related to mounting (such as a small mounting space or the presence of a high-temperature lubricating oil).

SUMMARY

It is thus desired to provide an alternating current generation system that is capable of favorable phase control even without providing a magnetic sensor for each phase.

An alternating current generation system of an exemplary embodiment includes an alternating current generator, a power converter, a detecting unit, and a phase control unit.

The alternating current generator includes a rotor and a stator. The rotor has a plurality of magnetized portions. The plurality of magnetized portions are ideally arrayed at even intervals in a circumferential direction so that the orientation of magnetic poles differ in an alternating manner. The stator has a plurality of windings that configure a plurality of phases. The plurality of windings are arrayed in order of phase (and ideally at even intervals) along the circumferential direction.

The rotor is provided with a plurality of detection subject portions, i.e., subject portions used for rotation detection. The detection subject portions are arrayed along the circumferential direction in correspondence to the reversal states of the magnetic poles so as to include at least the reversal positions of the magnetic poles in the plurality of magnetized portions. Specifically, the detection subject portions are provided so that the positions in the circumferential direction match the reversal positions of the magnetic poles (also referred to as commutation positions), so that, for example, the positions are concentric with the reversal positions and a straight line drawn from a rotation center axis of the rotor towards the reversal position passes through the detection subject portion. In addition, the detection subject portion may also be provided between two adjacent reversal positions.

The power converter is connected to the plurality of windings in the alternating current generator so as to transmit and receive power to and from the alternating current generator. The power converter is configured to be capable of bi-directional power conversion between an alternating current and a direct current by including a plurality of switching elements (specifically, a quantity corresponding to the number of phases in the alternating current generator).

The detecting unit is disposed opposing the rotor so as to generate an output signal corresponding to the passage state of the detection subject portions. The phase control unit is configured to output, to the power converter, a control signal to perform phase control of the switching elements depending on the rotation phase of the rotor, based on the output signal from the detecting unit.

In this configuration, the detection subject portions successively pass the position opposing the detecting unit in accompaniment with the rotation of the rotor. At this time, the detecting unit generates the output signal in correspondence to the passage state of the detection subject portions. Therefore, as a result of detection of the rotation phase of the rotor being performed based on the output signal generated by the detecting unit, phase control is favorably performed.

Therefore, in the embodiment, favorable phase control can be performed even when magnetic sensors for rotor phase (magnetic pole reversal position) detection that equal to the number of phases are not provided (typically, even when no magnetic sensor is provided at all). The output signal can also be used for other purposes (for example, operation control such as ignition control and fuel injection control in an internal combustion engine mounted in a vehicle). In other words, in the embodiment, typically, an engine rotation speed sensor (crank shaft rotation angle sensor) used in operation control of the internal combustion engine and a rotation phase detection sensor of the rotor can be actualized by the single detecting unit.

DESCRIPTION OF EMBODIMENTS

An alternating current generation system (or an alternating current generation apparatus) according to an embodiment of the present invention will hereinafter be described with reference to FIG. 1 to FIG. 6.

In the specific example according to this embodiment, the number of magnetic poles (2n) is 12 and the number of poles (3m) is 18. However, these quantities can be variously modified. The variation examples are collectively described after the description of the alternating current generation system according to the present embodiment.

Figure 1:
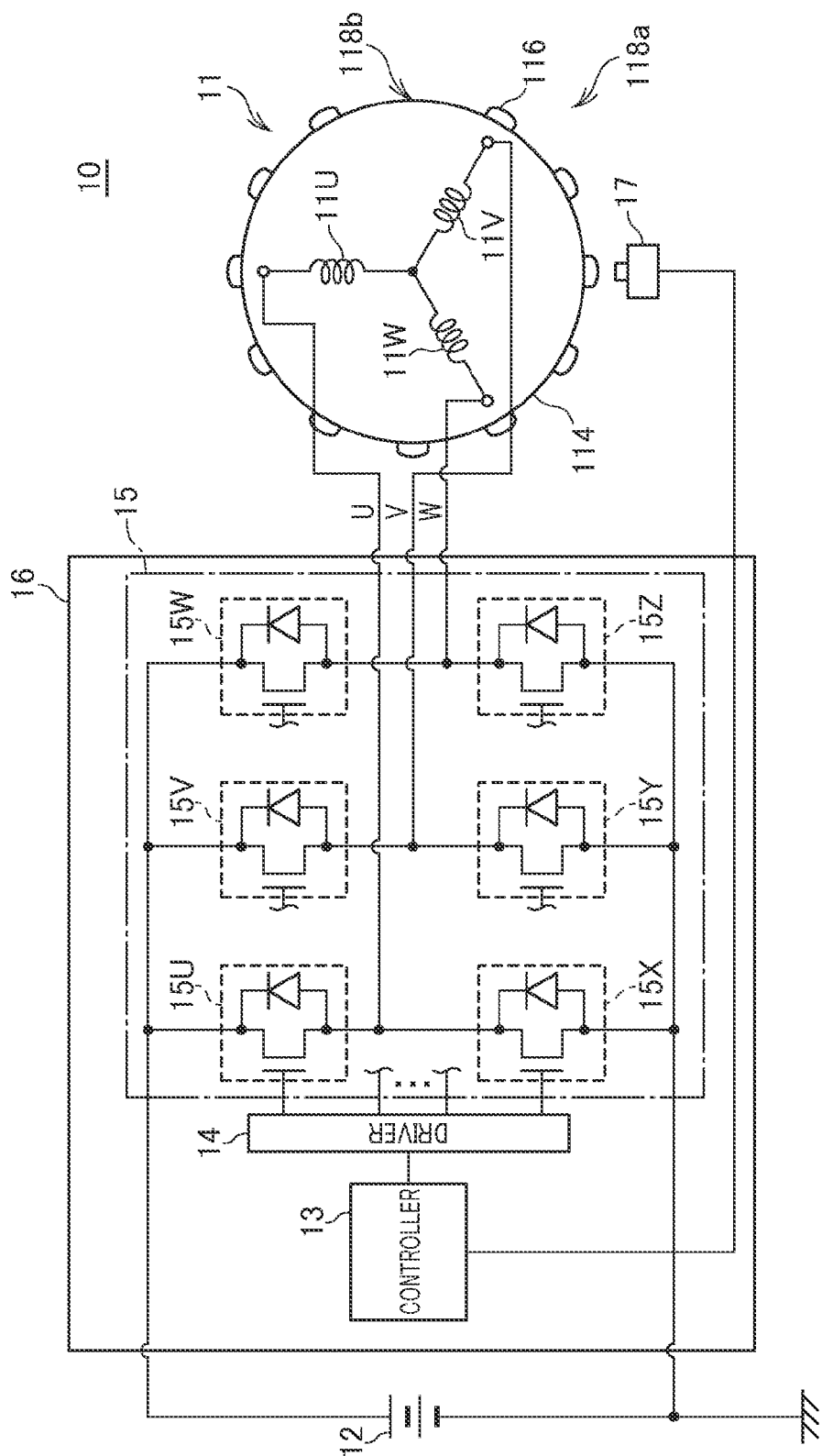
FIG. 1 is a diagram of an overall circuit configuration of an alternating current generation system according to an embodiment of the present invention.

With reference to FIG. 1, an alternating current generation system (or an alternating current generation apparatus) 10 according to the present embodiment includes a three-phase alternating current generator 11. In other words, the alternating current generator 11 has a U-phase coil 11U, a V-phase coil 11V, and a W-phase coil 11W. Details of the internal configuration of the alternating current generator 11 will be described hereafter.

The alternating current generation system 10 also includes a battery 12, a controller 13, a driver 14, and a power convertor 15. The power converter 15 includes switching elements 15U, 15V, 15W, 15X, 15Y, and 15Z. These switching elements are configured by semiconductor switching elements that are capable of being electrically turned ON and OFF.

The battery 12 is connected to a load that is provided in a motorcycle 20 (see FIG. 2) in which the alternating current generation system 10 is mounted, so as to supply power to the load. In addition, the battery 12 is connected to the alternating current generator 11 with the power converter 15 therebetween.

The controller 13 is a so-called microcomputer that includes a central processing unit (CPU), a read-only memory (ROM), a random access memory (RAM), and the like. The controller 13 controls operations of the overall alternating current generation system 10 by executing routines (programs) that are stored in the ROM in advance. The driver 14 is connected to a control terminal (gate or base) of each switching element 15U and so on, and is configured to perform so-called "phase control" in the power converter 15 by outputting drive signals to the switching elements 15U and so on at appropriate timings under the control of the controller 13. In other words, the driver 14 is capable of performing phase control by controlling the timings of the ON/OFF operations of the switching elements.

The power convertor 15 is configured to be capable of converting power bi-directionally, between an alternating current and a direct current. The power converter 15 is connected to the U-phase coil 11U, the V-phase coil 11V, and the W-phase coil 11W of the alternating current generator 11 so as to transmit and receive power to and from the alternating current generator 11. The switching elements 15U, 15V, 15W, 15X, 15Y, and 15Z of the power converter 15 are provided in correspondence to the U-phase coil 11U, the V-phase coil 11V, and the W-phase coil 11W of the alternating current generator 11.

Specifically, the switching element 15U and the switching element 15X are connected in series between the positive terminal and the negative terminal of the battery 12 (the switching element 15V and switching element 15Y pair and the switching element 15W and switching element 15Z pair are also similarly connected). The connection position between the switching element 15U and the switching element 15X is connected to one end of the U-phase coil 11U. In a similar manner, the connection position between the switching element 15V and the switching element 15Y is connected to one end of the V-phase coil 11V. In addition, the connection position between the switching element 15W and the switching element 15Z is connected to one end of the W-phase coil 11W.

The switching element 15U (also similarly applies to the other switching elements 15V and so on) includes a transistor element that is capable of sending a forward-direction current that flows from the positive terminal side to the negative terminal side of the battery 12 by the control terminal being energized, and a diode element that is capable of sending a reverse-direction current that flows from the negative terminal side to the positive terminal side. Specifically, according to the present embodiment, the switching element 15U (also similarly applies to the other switching elements 15V and so on) is composed of an N-channel type metal-oxide-semiconductor field-effect transistor (MOSFET), and a parasitic diode is formed in the direction in which the current flows from the source to the drain.

An electronic control unit (ECU) 16 includes the above-described controller 13, driver 14, and power converter 15. In addition, the ECU 16 is connected to a rotation angle sensor 17. The rotation angle sensor 17 is configured to generate a signal corresponding to the rotation state of the alternating current generator 11 (details of the rotation angle sensor 17 will be described hereafter). The ECU 16 is configured to output a control signal for performing phase control of the power converter 15 to the driver 14, based on the output from the rotation angle sensor 17. In other words, the ECU 16 is configured to perform "phase control" of the alternating current generation system 10 based on the operating state of the motorcycle 20 (see FIG. 2). Sections other than the rotation angle sensor 17 in the configuration shown in FIG. 1 and "phase control" are already known. Therefore, more detailed descriptions thereof are omitted (for example, refer to JP-A-H08-214470, JP-A-H10-262343, JP-A-H11-46456, and JP-A-2004-173482).

Figure 2:
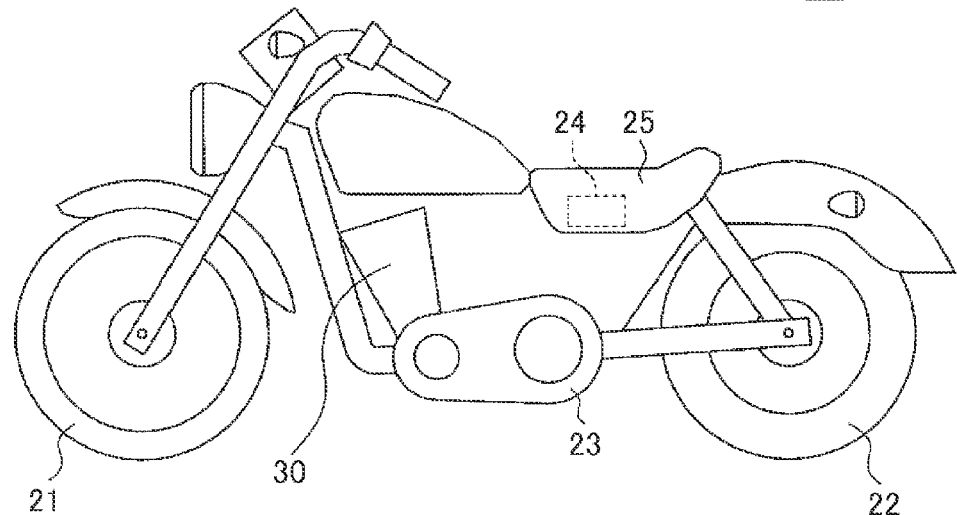
FIG. 2 is a schematic configuration diagram of a motorcycle that is a vehicle in which the alternating current generation system shown in FIG. 1 is mounted.

With reference to FIG. 2, the motorcycle 20 that corresponds to a vehicle of the present invention is provided with a front wheel 21 and a rear wheel 22 that serves as a driving wheel. In addition, a power transmission mechanism 23 and a vehicle control unit 24 are mounted in the motorcycle 20. The vehicle control unit 24 is an electronic control unit for controlling the overall operation of the motorcycle 20 and is provided under a seat 25. The ECU 16 shown in FIG. 1 is mounted in the vehicle control unit 24.

Figure 3:
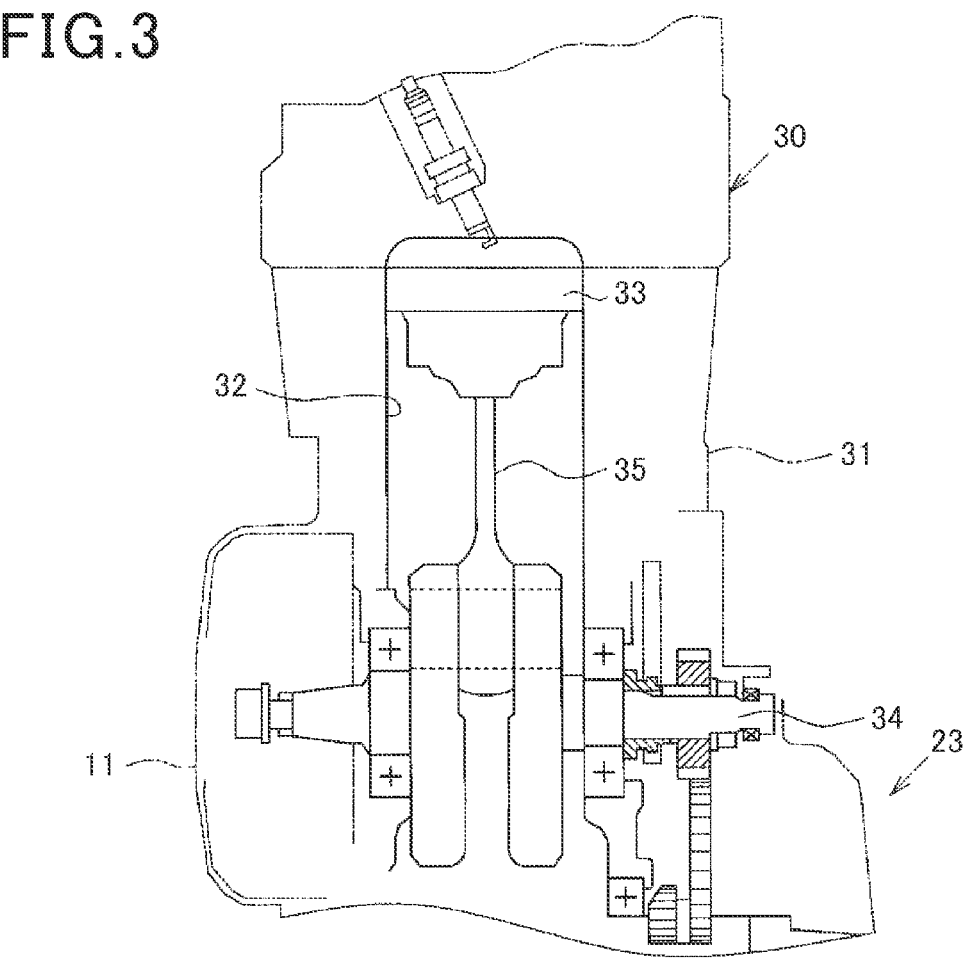
FIG. 3 is a schematic diagram of an internal configuration of an engine shown in FIG. 2.

With reference to FIG. 3, a single cylinder 32 is formed within an engine block 31 that configures the casing of an engine 30. In other words, the engine 30 that is mounted in the motorcycle 20 according to the present embodiment is configured as a so-called "single cylinder engine" that has a single cylinder 32. A piston 33 is housed within the cylinder 32 so as to be capable of reciprocal movement along a center axial line of the cylinder 32. The piston 33 is connected to a crank shaft 34 with a connecting rod 35 therebetween.

Figure 4:
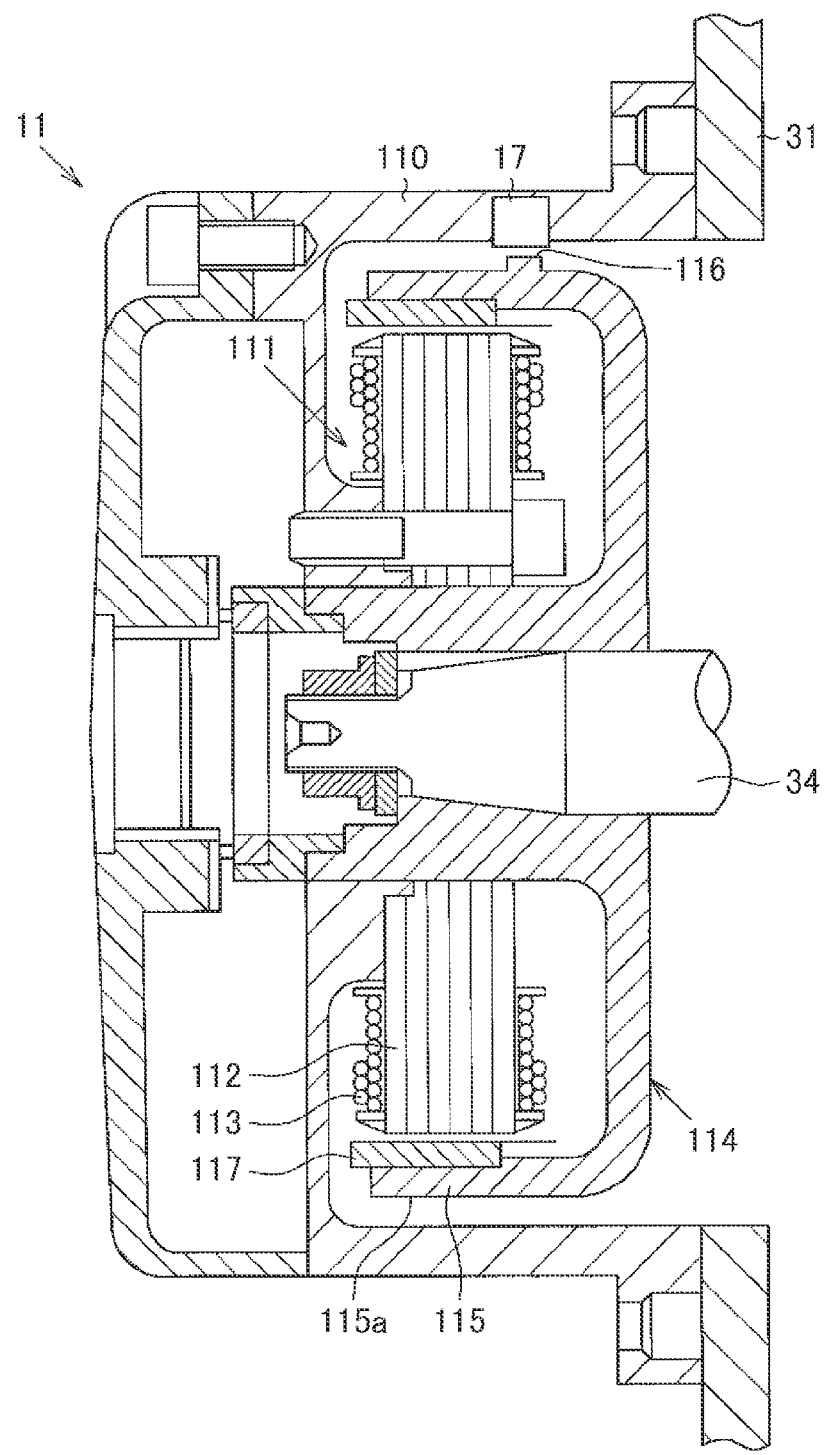
FIG. 4 is a cross-sectional view of an internal configuration of an alternating current generator shown in FIG. 3.
Figure 5:
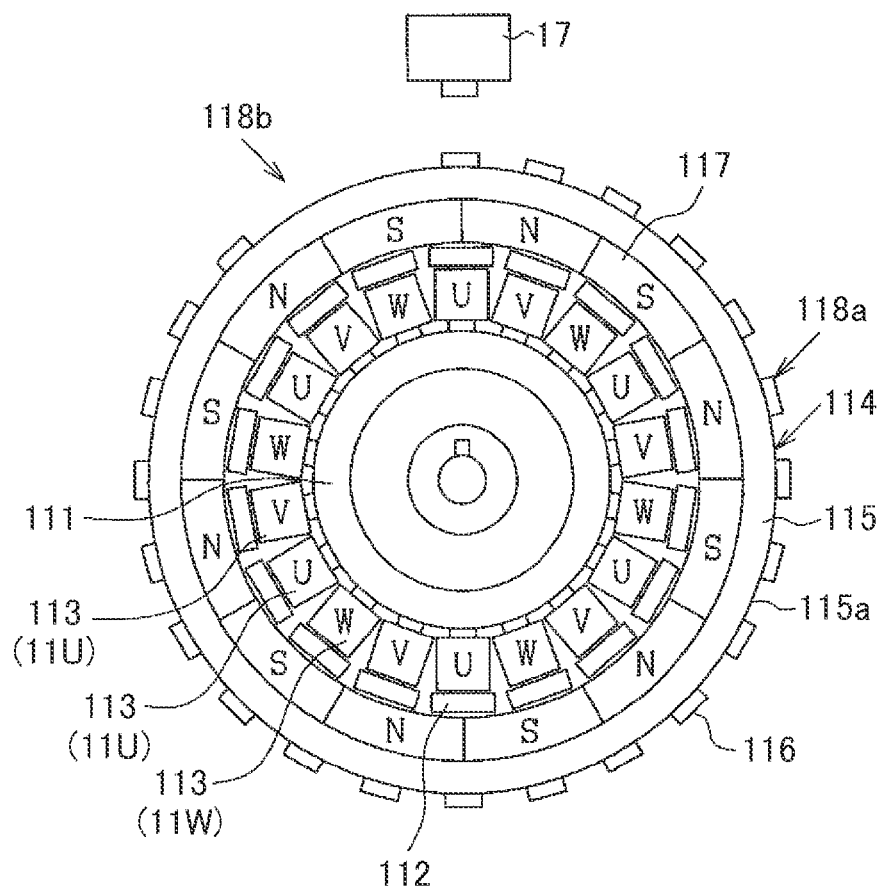
FIG. 5 is a schematic diagram of the internal configuration of the alternating current generator shown in FIG. 3.

Details of the internal configuration of the alternating current generator 11 according to the present embodiment will be described below, with reference to FIG. 4 and FIG. 5. FIG. 4 corresponds to a cross-sectional view in which the alternating current generator 11 in FIG. 3 is enlarged. According to the present embodiment, a housing 110 that configures the casing of the alternating current generator 11 is formed to be substantially cup-shaped from a cross-sectional side view, and is fixed to the engine block 31 so that the opening portion thereof communicates with the inside of the engine block 31.

A stator 111 is fixed to the inner side of the housing 110. The stator 111 is provided with numerous (18 according to the present embodiment) cores 112 that are provided at even intervals along a circumferential direction so as to project outwards in a radiating manner from the rotation center axis of the alternating current generator 11. A winding 113 that configures the U-phase coil 11U, the V-phase coil 11V, and the W-phase coil 11W is wound around each core. In other words, six each of the U-phase coil 11U, the V-phase coil 11V, and the W-phase coil 11W are arrayed in the order of phases (in the order of U-V-W, that is, the U-phase coil 11U, the V-phase coil 11V, the W-phase coil 11W, the U-phase coil 11U, the V-phase coil 11V, the W-phase coil 11W etc.) and at even intervals along the circumferential direction.

A rotor 114 is housed within a space surrounded by the engine block 31 and the housing 110, and is directly connected to the crank shaft 34. Specifically, the rotor 114 includes a yoke 115 that is substantially cup-shaped from a cross-sectional side view. The yoke 115 is fixed to one end of the crank shaft 34. An outer circumferential surface 115a of the yoke 115 in the substantially cylindrical portion thereof is provided with numerous detection subject portions 116, i.e., subject portions 16 used for rotation detection. According to the present embodiment, the detection subject portion 116 is a projection provided on the outer circumferential surface 115a and is formed so as to project outwards from the outer circumferential surface 115a. Furthermore, according to the present embodiment, the detection subject portions 116 are provided so as to correspond to an array of numerous magnetized portions 117 (reversal state of magnetic poles) that are provided in a fixed manner to the substantially cylindrical portion of the yoke 115.

Specifically, the numerous (12 according to the present embodiment) magnetized portions 117 are arrayed at even intervals along the circumferential direction so that the orientations of the magnetic poles differ in an alternating manner. With a specific position (the uppermost portion in FIG. 5) that is the position in which the magnetic poles reverse as a result of two adjacent magnetized portions 117 abutting each other serving as a base point, a total of 22 detection subject portions 116 are provided so as to be continuously arrayed at even intervals (every predetermined interval) in the center positions of the magnetized portions 117 in the circumferential direction and other magnetic pole reversal positions (referred to hereafter as a "commutation positions", including the above-described specific position) where two adjacent magnetized portions 117 abut each other. The 22 continuous detection subject portions 116 form a first identification portion 118a.

Furthermore, a second identification portion 118b is formed by an "untoothed" portion (a portion in which two detection subject portions 116 are omitted) in which the detection subject portions 116 are not provided, between two ends of the first identification portion 118a (the two ends in the array direction of the 22 detection subject portions 116). In other words, the second identification portion 118b is formed by the exposed outer circumferential surface 115a of the yoke 115 that has a wider width than the width between the adjacent detection subject portions 116 in the first identification portion 118. According to the present embodiment, the detection subject portion 116 that corresponds to the commutation position is positioned concentrically with the commutation position and is provided so that a straight line drawn from the above-described rotation center axis (that is, the rotation center axis of the rotor 114) towards the commutation position passes through the detection subject portion 116 (however, from electrical and control perspectives, the straight line does not necessarily pass through the center of the detection subject portion 116 in the circumferential direction).

In addition, the rotation angle sensor 17 is mounted in the housing 110. The rotation angle sensor 17 is disposed opposing the detection subject portions 116 so as to generate an output signal that corresponds to the passage state of the detection subject portions 116. Specifically, the rotation angle sensor 17 is configured to generate a pulse-like signal (referred to, hereafter, as a "passage pulse") each time a detection subject portion 116 passes. During a single rotation of the rotor 114 (that is, a single rotation of the crank shaft 34), the rotation angle sensor 17 generates an output signal that has a portion in which 22 passage pulses continue in correspondence to the passage of the first identification portion 11a and a portion in which the passage pulse is not present in correspondence to the second identification portion 118b.

With reference again to FIG. 1, in the alternating current generation system 10 according to the present embodiment, the controller 13 and the driver 14 in the ECU 16 are configured to output, to the power converter 15, a control signal for performing phase control of the switching element 15U and so on that depends on the rotation phase of the rotor 114, based on the output from the rotation angle sensor 17.

In other words, the ECU 16 is configured to detect the rotation phase of the rotor 114 based on the output from the rotation angle sensor 17 and perform phase control based on the detected rotation phase. In addition, the ECU 16 is configured to perform correction of the rotation phase (correction of the detection value of the rotation phase) of the rotor 114 that has been detected based on the output from the rotation angle sensor 17, based on the actual output of the alternating current generator 11. Details of the correction will be described hereafter.

The operations (working and effects) of the configuration according to the present embodiment will be described below.

In the configuration according to the present embodiment, the first identification portion 118a and the second identification portion 118b successively pass the position opposing the rotation angle sensor 17 in accompaniment with the rotation of the rotor 114. At this time, the output signal corresponding to the passage state of the detection subject portions 116 is generated by the rotation angle sensor 17.

Here, as described above, in the first identification portion 118a, 22 detection subject portions 116 are arrayed at even intervals along the circumferential direction in correspondence to the reversal states (that is, the above-described "commutation positions") of the magnetic poles of the 12 magnetized portions 117. Meanwhile, in the second identification portion 118b, the detection subject portions 116 are not provided. Therefore, the rotation phase of the rotor 114 can be accurately detected based on the output signal generated by the rotation angle sensor 17. As a result, according to the present embodiment, favorable phase control can be performed even when magnetic sensors for commutation position detection that amount to the number of phases are not provided (typically, even when no magnetic sensor is provided at all).

Here, as described above, the rotor 114 may be housed in the space surrounded by the engine block 31 and the housing 110, and directly connected to the crank shaft 34 (in particular, a motorcycle). In this case, the high-temperature lubricating oil within the engine block 31 may fly towards the rotor 114 side or the rotor 114 may be immersed in the lubricating oil. Therefore, in this case, it is difficult to provide a plurality (that, amounting to the number of phases) of magnetic sensors for commutation position detection. Regarding this point, in the configuration according to the present embodiment, favorable phase control can be performed even in such cases.

Furthermore, the output signal from the rotation angle sensor 17, such as that described above, can also be used for other purposes (such as detection of engine rotation speed NE that is a signal for operation control like ignition control and fuel injection control in the engine 30). Therefore, in the configuration according to the present embodiment, detection of the rotation phase of the rotor 114 and detection of the engine rotation speed (engine rotation frequency) NE for operation control of the engine 30 can be performed by a single detecting means.

A slight error may occur during manufacturing in the correspondence relationship between the position in which the detection subject portion 116 is provided and the commutation position. In other words, among the detection subject positions 116, the detection subject portions 116 that are formed in correspondence to the commutation positions are each ideally provided so that the generation timing of a zero-crossing point of the phase voltage generated at each winding 113 and a predetermined timing determined by the controller 13 based on the passage pulse generated by the rotation angle sensor 17 in accompaniment with the passage of the detection subject portion 116 are synchronized (both timings match at a control angle "0° CA", described hereafter). In this case, typically, each magnetized portion 117 and each detection subject portion 116 are formed so that the commutation position and the position of the detection subject portion 116 in the circumferential direction substantially match in terms of the mechanical positional relationship (a straight line drawn from the rotation center axis towards the commutation position passes through the vicinity of the center of the detection subject portion 116 positioned further outward than the commutation position). As a result, the above-described synchronization can be stably reproduced in manufacturing.

However, an error may occur in the targeted positional relationship, such as that described above, during magnetization (or when magnetized) of the rotor 114 or formation of the detection subject portion 116. Specifically, for example, various errors may occur during machine processing performed to form the detection subject portions 116 (such as an error in the position or shape of a single detection subject portion 116 or a pitch error among a plurality of detection subject portions 116). Furthermore, an error in phase control may occur as a result of a "delay" occurring in detection and control.

Therefore, according to the present embodiment, the ECU 16 performs correction of the rotation phase detection (based on the output from the rotation angle sensor 17) of the rotor 114 based on the actual output of the alternating current generator 11. The correction is referred to, hereafter, as simply "phase correction".

Figure 6:
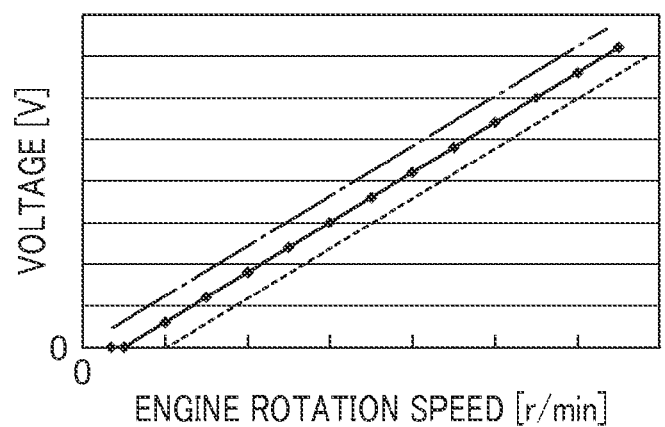
FIG. 6 is a graph for describing an overview of a correction process for rotation phase detection performed by a controller shown in FIG. 1.

Specifically, the power generation output characteristics (output voltage characteristics in relation to engine rotation speed) of when the control angle in phase control (the extent of the advance angle or the delay angle in the energization timing of the switching element 15U and the like in relation to the output voltage waveform during normal power generation in which phase control is not performed) is "0° CA" in a certain operating state (such as cooling water temperature or outside temperature) in an "ideal" state without any manufacturing errors or control errors is presumed to be as indicated by the solid line in FIG. 6. At this time, should the commutation position be shifted towards the "delay angle" side in relation to the detection subject portion 116 as a result of manufacturing error or the like, the power generation output characteristics shift upwards in FIG. 6 (see the dotted chain line). Conversely, when the commutation position is shifted towards the "advance angle" side in relation to the detection subject portion 116, the power generation output characteristics shift downwards in FIG. 6 (see the broken line).

According to the present embodiment, phase correction can be performed by a comparison between the actual output voltage of the alternating current generator 11 and a predetermined reference value (corresponding to the points on the solid line in FIG. 6) stored in the ROM or a backup RAM (a non-volatile memory that rewritably stores data and the like during power supply and maintains the storage of data and the like even when power supply is stopped: flash ROM and the like) in advance, at a certain operating point (a certain engine rotation speed in FIG. 6: the "engine rotation speed" herein is acquired based on the output signal from the rotation angle sensor 17). As a result, a more accurate phase control can be performed. The correction value for each operating state is successively stored in the backup RAM in a map-state or a look-up table-state, for each calculation operation.

<Variation Example>

Several representative variation examples are given below. In the descriptions of the variation examples below, sections having configurations and functions similar to those described in the above-described embodiment are given similar reference numbers as those in the above-described embodiment. Descriptions of such sections can be supported by the descriptions according to the above-described embodiment within a range that technical contradictions do not occur. It goes without saying that the variation examples are not limited to those given below. In addition, the plurality of variation examples can, in their entirety or in part, be used in combination as appropriate within a range that technical contradictions do not occur.

According to the above-described embodiment, the number of magnetic poles in the rotor 114, which is the number of magnetized portions 117, is 12. The number of poles (the number of cores) in the stator 111 is 18. The first identification portion 118a is the 22 projections that are arrayed at even intervals along the circumferential direction of the rotor 114, and the second identification portion 118b is the portion that has no projections. However, the present invention is not limited thereto.

In other words, the number of windings 113, the number of magnetized portions 117, and the number of detection subject portions 116 can be changed as appropriate. Specifically, the alternating current generator 11 may be configured so that the number of magnetic poles in the rotor 114 is 2n (n is an integer of 1 or greater), and the number of poles in the stator 111 may be 3m (m is an integer of 1 or greater, and may be the same as or differ from n). In addition, the detection subject portion 116 is merely required to be provided to include at least the commutation position that is the reversal position of the magnetic poles. As a result of the number of detection subject portions 116 being increased, the detection accuracy of the rotation phase of the rotor 114 and the engine rotation speed NE is improved, and in particular, the reliability of control against rotation variations is improved. Conversely, as a result of the number of detection subject portions 116 not being excessive, the calculation load on the controller 13 is reduced. The number of detection subject portions 116 omitted in the second identification portion 118b can also be changed as appropriate, within a range enabling favorable rotation phase detection.

In the single cylinder engine 30, because the variation in the reciprocal movement speed of the piston 33 is significant, it is considered effective to include a large number of detection subject portions 116. An engine 30 having a plurality of cylinders can also be similarly controlled.

In addition, when the position of the detection subject portion 116 is matched with the commutation position (inter-magnetic pole pitch position), management of the positions of the detection subject portions 116 and the assembly positions of the magnets is facilitated, accuracy can be easily improved, and therefore, this configuration is preferable. However, the positions are not necessarily required to match.

Figure 7:
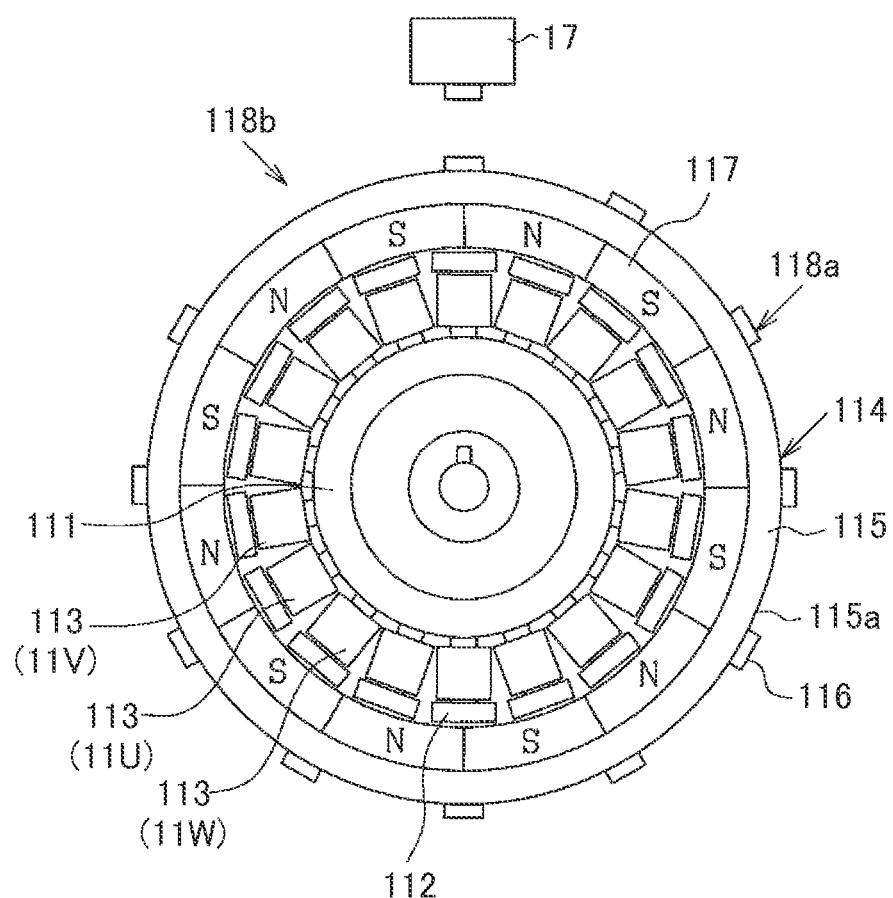
FIG. 7 is a schematic diagram of a variation example of the internal configuration of the alternating current generator shown in FIG. 3.

From this perspective, as in the specific example given according to the above-described embodiment, when the number of poles in the stator 111 is 18 and the number of magnetic poles in the rotor 114 is 12 (six pole pairs), the number of detection subject portions 116 is preferably 22 (24−2). Moreover, as shown in FIG. 7, the detection subject portions 116 may only be provided in the commutation positions (the number of detection subject portions 116 is 11=(12−1)). In this case, the passage pulse is generated every 30° CA. Commutation occurs three times between adjacent passage pulses in the U-phase, V-phase, and the W-phase. Therefore, as a result of the wavelength of the passage pulse in the output signal from the rotation angle sensor 17 being divided into thirds, estimation of the desired commutation position can be performed with low control load.

The detection subject portions 116 can be further reduced from the configuration shown in FIG. 7. As a result, further reduction in manufacturing cost and processing load can be achieved.

Figure 8:
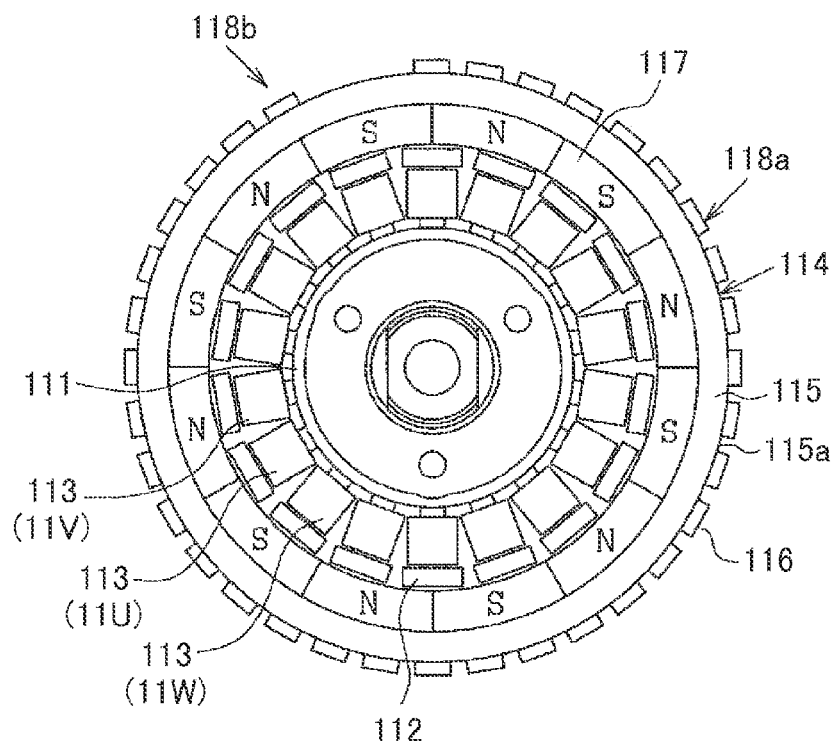
FIG. 8 is a schematic diagram of another variation example of the internal configuration of the alternating current generator shown in FIG. 3.

As shown in FIG. 8, two detection subject portions 116 may be provided between adjacent commutation positions (the number of detection subject portions 116 is 34=(36−2)). In this case, the array pitch of the detection subject portions 116 is also completely synchronous with the array pitch of the windings 113, in addition to the array of the magnetized portions 117. In other words, the ON/OFF switch timings of the six switching elements 15U to 15Z and the above-described passage pulse can be completely synchronized so as to be generated at every 10° CA. Therefore, in this configuration, a more accurate phase control becomes possible.

Figure 9:
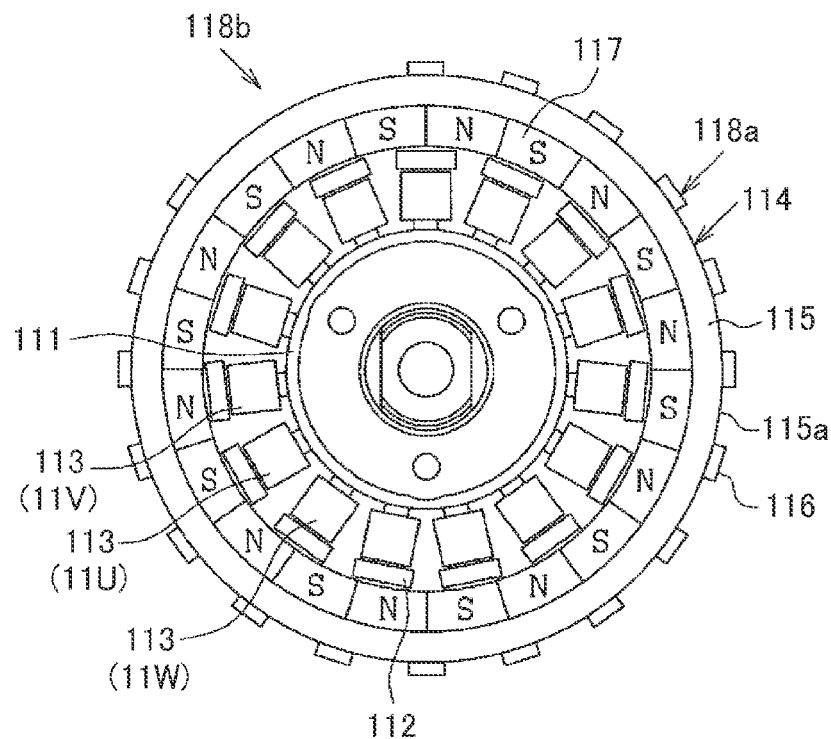
FIG. 9 is a schematic diagram of another variation example of the internal configuration of the alternating current generator shown in FIG. 3.

As shown in FIG. 9, when the number of poles in the stator 111 is 15 and the number of magnetic poles in the rotor 114 is 20 (10 pole pairs), the number of detection subject portions 116 is preferably 18 (20−2).

As described above, when expressed using the number of magnetic poles Nj, the number of detection subject portions 116 Nk can be as indicated below. The number of detection subject portions 116 Nk can be selected as appropriate based on the specification of the alternating current generation system 10 or the high-order system (such as the motorcycle 20) in which the alternating current generation system 10 is mounted.

$$Nk=Nj-\alpha \quad (1)$$

$$Nk=\beta \cdot Nj-\alpha \quad (2)$$

$$Nk=(Nj/\gamma)-\alpha \quad (3)$$

(α is an integer and is 1 or greater, preferably 1 to 3, and more preferably 2. B and γ are integers and are both 2 or greater.)

When the alternating current generation system 10 is mounted in a vehicle and the alternating current generator 11 is directly connected to the crank shaft 34 of the engine 30 (in particular, when the engine 30 is a four-cycle engine), rotation variation becomes the largest at the expansion stroke. Therefore, in this case, setting conditions (quantity and positions) of the detection subject portions 116 can be set as appropriate so that the robustness of phase control in relation to the rotation variation at the expansion stroke is improved.

The detection subject portion 116 is not limited to a projection. For example, the detection subject portion 116 may be a recessing portion, or may be a portion (such as a black marking) of which the reflectance of electromagnetic waves (typically visible light or infrared light) differs from that of the outer circumferential surface 115a of the yoke 115.

In addition, the second identification portion 118b may be a portion having a higher presence density of the detection subject portions 116 than the first identification portion 118a. In other words, when the detection subject portions 116 are placed throughout the overall circumference of the outer circumferential surface 115a, the second identification portion 118b may be a portion having additional projections for detection of the reference position.

Furthermore, the second identification portion 118b may be a projection having a larger width in the circumferential direction than the projection included in the first identification portion 118a. When the detection subject portions 116 are provided evenly on the outer circumferential surface 115a of the yoke 115 (in other words, when the first identification portion 118a and the second identification portion 118b are not provided: refer to JP-A-2009-232650 and the like), favorable phase detection can be performed by the output signal from a cam position sensor provided in the engine 30 also being used.

When the output voltage is used for phase correction as in the specific example according to the above-described embodiment, the addition of a detection element for correction is not required. In addition, because the voltage is monitored, minute correction control can be performed that takes into consideration the effects of disturbances. Meanwhile, phase correction can also be performed under principles similar to those of the specific example by using output current as well. In this case, phase correction can be performed while monitoring the current that is the final output performance of the alternating current generator 11. However, in this case, an element for current detection (such as a shunt resistor or a sense MOS) is required to be provided separately.

In addition, phase correction is preferably performed when the operating state is stable. Therefore, correction may be performed when the values of operating state parameters (such as the engine rotation speed NE, engine cooling water temperature T, and engine load rate KL) or variations therein are predetermined values or lower. This specific example will be described using the flowchart in FIG. 10.

Figure 10:
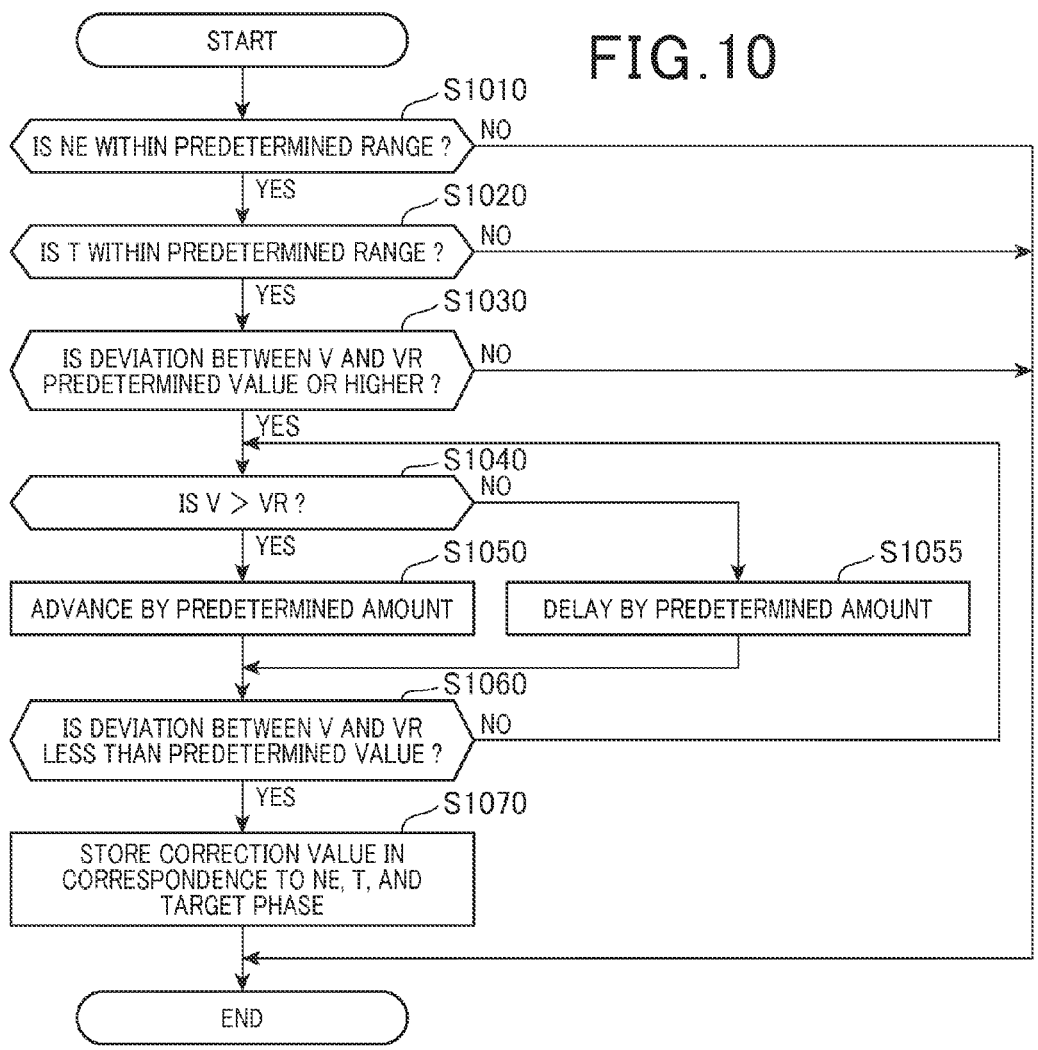
FIG. 10 is a flowchart for describing an overview of the correction process for rotation phase detection performed by the controller shown in FIG. 1.

The process in FIG. 10 is performed by the controller 13 when a predetermined condition (such as the elapse of a predetermined amount of time t1 after startup of the engine 30) for starting the correction process is met. When the execution of the process is started, first, at Step S1010, the controller 13 determines whether or not the variation in engine rotation speed NE is within a predetermined range ΔNE1 (here, the engine rotation speed NE has been obtained based on the output signal from the rotation angle sensor 17; the same applies hereafter). When determined that the variation in engine rotation speed NE is within the predetermined range (Step S1010=YES), the process proceeds to Step S1020, and the controller 13 determines whether or not the engine cooling water temperature T is within a predetermined range. When determined that the engine cooling water temperature T is within the predetermined range (Step S1020=YES), the process proceeds to Step S1030, and the controller 13 determines whether or not the deviation between the output voltage V and a target value VR is a predetermined value or higher. Here, the "target value VR" is a reference value in an "ideal" state without any manufacturing errors or control errors, and is stored in the ROM or a backup RAM in advance.

When determined that the variation in engine rotation speed NE is not within the predetermined range (Step S1010=NO) or the engine cooling water temperature T is not within the predetermined range (Step S1020=NO), the operating state is not suitable for phase correction in the current process. Therefore, in these cases, the process at Step S1030 and subsequent processes are skipped, and processing of this routine is temporarily ended. Meanwhile, when determined that the deviation between the output voltage V and the target value VR is less than the predetermined value (Step S1030=NO), correction is not required in the operating state in the current process. Therefore, in this case, the process at Step S1040 and subsequent processes are skipped, and processing of this routine is temporarily ended. Hereafter, the description will be continued under a presumption that the determinations made at Steps S1010 to 1030 are all "YES".

At Step S1040, under a premise that the deviation between the output voltage V and the target value VR is the predetermined value or higher, the controller 13 determines whether or not the output voltage V is higher than the target value VR. When determined that the output voltage V is higher than the target value VR (Step S1040=YES), the process proceeds to Step S1050, and the controller 13 advances the control angle by a predetermined minute amount. Meanwhile, when determined that the output voltage V is lower than the target value VR (Step S1040=NO), the process proceeds to Step S1055, and the controller 13 delays the control angle by a predetermined minute amount.

After the process at Step S1050 or 1055 has been performed, the process proceeds to Step S1060. At Step S1060, the controller 13 determines whether or not the deviation between the output voltage V and the target value VR is less than a predetermined value. When determined that the deviation between the output voltage V and the target value VR is not less than the predetermined value, the determination at Step S1060 becomes "NO" and the process returns to Step S1040. Meanwhile, when determined that deviation between the output voltage V and the target value VR is less than the predetermined value (Step S1060=YES), the process proceeds to Step S1070, and the controller 13 stores the correction value in a map (look-up table) on the backup RAM in correspondence to the operating state (the engine rotation speed NE and the engine cooling temperature T) and a target phase (target control angle).

In addition, phase correction (that is, correction of the rotation phase of the rotor) may be performed based on the variations in actual output from the alternating current generator 11 when the control angle for phase control is changed, when the operating state is stable. In other words, for example, the correction value obtained as described above can be updated as appropriate by changing (scanning), as appropriate, the control angle for phase control when the operating state is stable. As a result, the reliability of phase correction (in particular, in a high-rotation region in which processing delay occurs) is improved.

Figure 11:
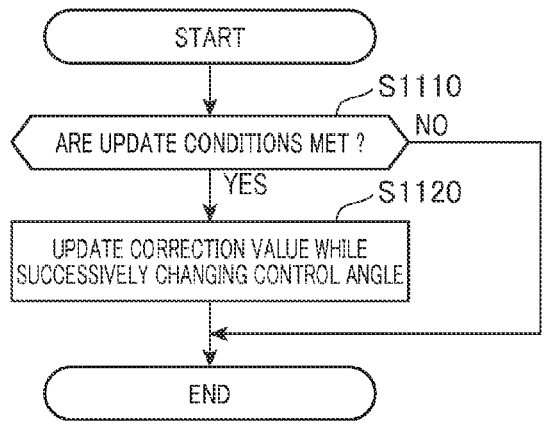
FIG. 11 is a flowchart for describing an overview of the correction process for rotation phase detection performed by the controller shown in FIG. 1.

Specifically, for example, with reference to the flowchart in FIG. 11, when a predetermined correction value update condition (such as the elapse of a predetermined amount of time t2 (>t1) after startup of the engine 30 or the variation amount of the engine rotation speed NE being within a predetermined range ΔNE2 (<ΔNE1)) is met (Step S1110=YES), the controller 13 performs the above-described process in the flowchart in FIG. 10 (although the processes at Steps S1010 and S1020 may be omitted), while changing the control angle as appropriate (Step S1120). Subsequently, when this process is performed a predetermined number of times and the correction value map is sufficiently updated, the correction value update process is ended.

Phase correction can also be easily actualized without use of a map by ordinary feedback correction of the target value. Specifically, for example, phase correction can be performed by detecting the peak characteristics (specifically, retrieving the maximum value) of the power generation output (current and/or voltage) when the control angle is changed by a predetermined amount as described above. This technique can be favorably used in the low rotation region in which power generation performance is low. The correction technique may be changed depending on the operating region. Specifically, processing load and correction accuracy can both be achieved by performing the peak-retrieval type feedback correction that does not have a map, such as that described above, for the low rotation region and the update-type correction that uses a map (also referred to as a learning correction), such as that described above, for the intermediate and high rotation regions.

Figure 12:
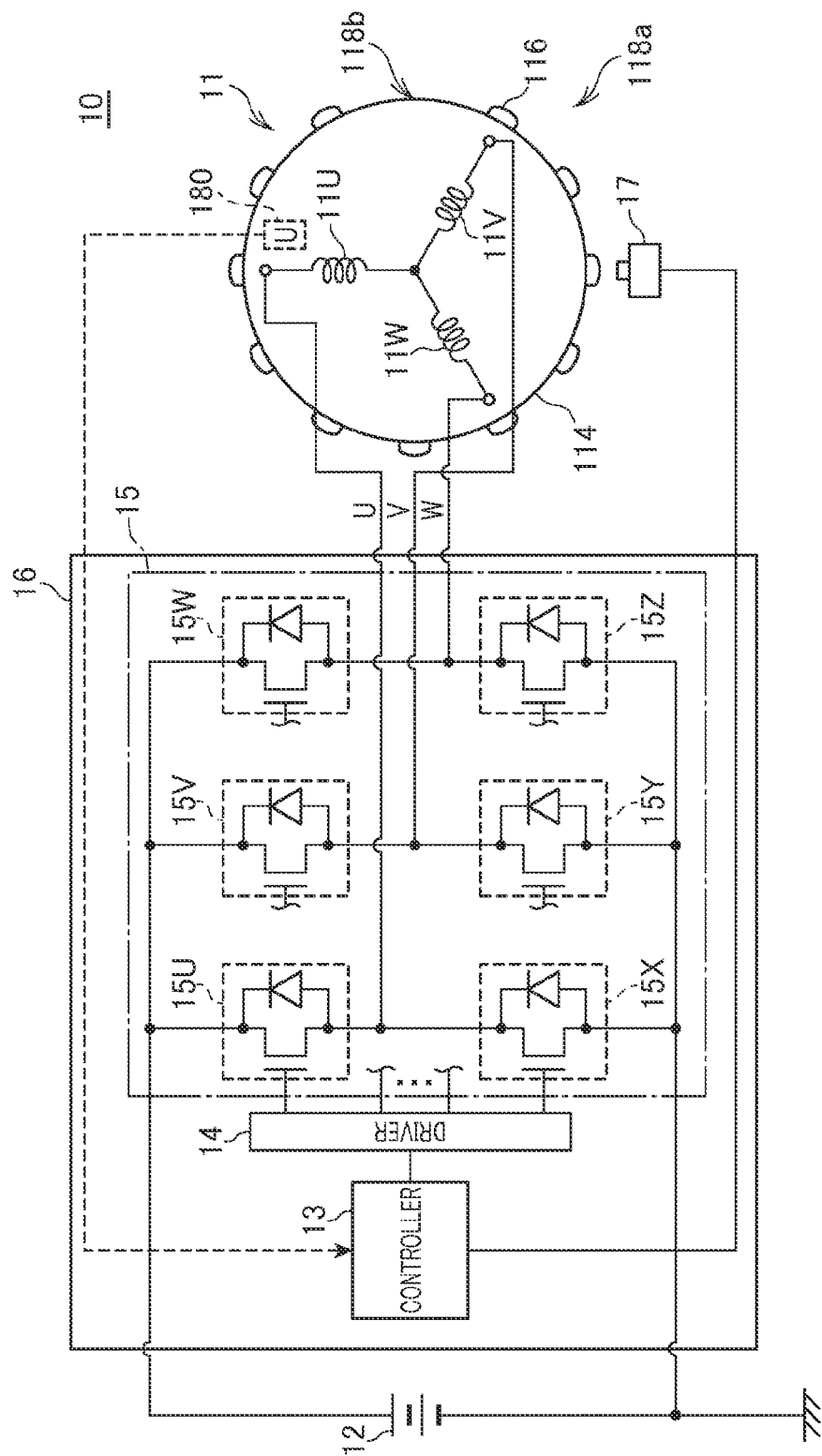
FIG. 12 is a diagram of an overall circuit configuration of a variation example of the alternating current generation system shown in FIG. 1.

In addition, as shown in FIG. 12, phase correction may also be performed by additionally providing a Hall sensor 180 amounting to a single phase as an additional detecting unit that magnetically detects the commutation position. In other words, the effect of "misalignment" between the detection subject portion 116 and the commutation position is similar among all of the plurality of phases. Therefore, favorable phase correction can be performed by the phase misalignment being detected in a single arbitrary phase. In this case, the number of Hall sensor 180 elements that is provided is one. Therefore, in this configuration, the accuracy of phase correction can be improved without particularly causing problems in terms of mounting. In this way, providing only a single Hall sensor 180 to compensate for the misalignment between the detected phase by the rotation angle sensor 17 and the actual phase is preferable.

Figure 13:
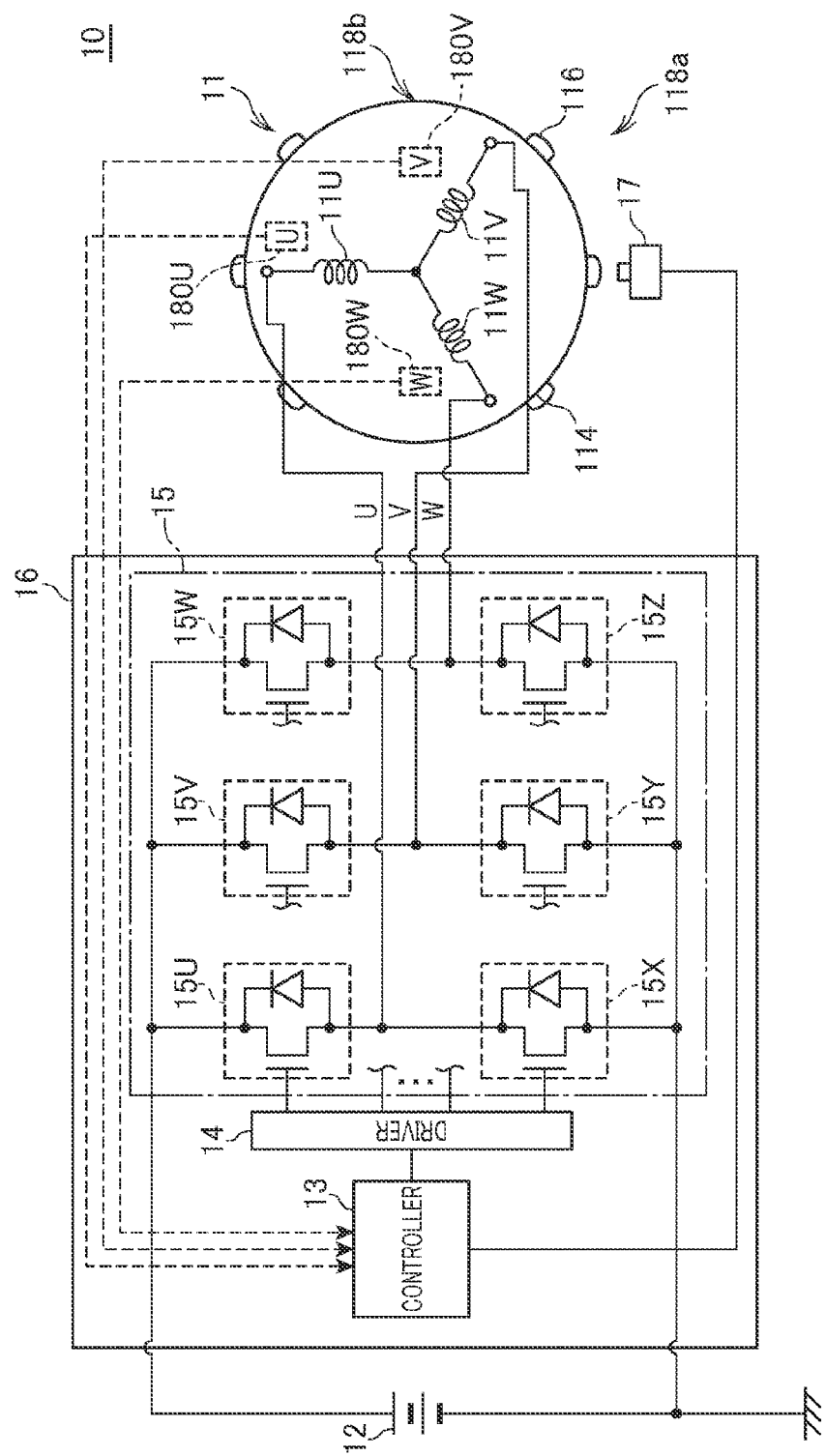
FIG. 13 is a diagram of an overall circuit configuration of another variation example of the alternating current generation system shown in FIG. 1.

Furthermore, as shown in FIG. 13, Hall sensors 180U, 180V and 180W amounting to the number of phases that have been conventionally used for phase control may be used in combination with the rotation angle sensor 17. As a result, even when a situation occurs in which phase control using the Hall sensors 180U, 180V and 180W amounting to the number of phases does not work normally (for example, a problem such as an abnormality, malfunction, or the like in the Hall sensors 180U and so on), a "failsafe" for phase control can be performed through use of the rotation angle sensor 17.

Figure 14:
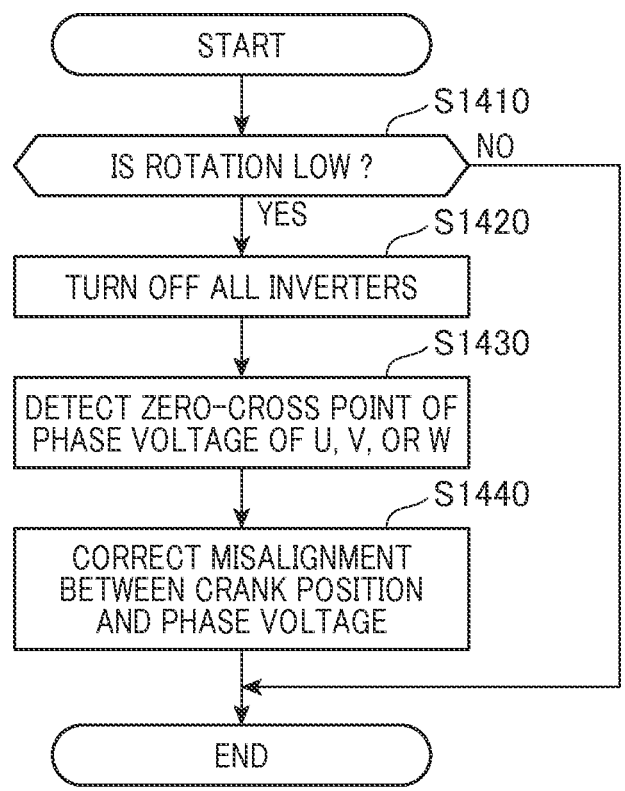
FIG. 14 is a flowchart for describing an overview of the correction process for rotation phase detection performed by the controller shown in FIG. 1

Furthermore, in an operating state in which the rotation frequency (rotation speed) of the rotor 114 is low, the operations of the transistor elements in all switching elements 15U to 15Z in the power converter 15 may be turned OFF, and full-wave rectification may be performed by only the operations of the diode elements. The output voltage waveform of each phase at this time may be monitored, and phase correction may be performed based on the zero-crossing point of the waveform and the output signal from the rotation angle sensor 17. FIG. 14 is a flowchart of a specific example of phase correction.

First, at Step S1410, the controller 13 determines whether or not the current rotation frequency of the rotor 114 (that is, the engine rotation speed NE) is within a predetermined low rotation region. When determined that the rotation frequency of the rotor 114 is not within the predetermined low rotation frequency (Step S1410=NO), the process at Step S1420 and subsequent processes are skipped, and the current correction process is temporarily ended. Meanwhile, when determined that the rotation frequency of the rotor 114 is within the predetermined low rotation frequency (Step S1410=YES), the process proceeds to Step S1420 and subsequent steps, and the correction process is performed. The reason for performing the current correction process in the low rotation region is as follows. In the low rotation region, the amount of power generation is low, and therefore, loss is low and the amount of heat generation caused thereby is low. Therefore, phase detection and correction can be favorably performed. The reversal position of the magnetic poles may be able to be accurately detected without the effects of load current as a result of the generated power becoming low (may often be lower than the battery voltage) and the voltage being a no-load voltage.

At Step S1420, the controller 13 turns OFF the operations of the transistor elements of all switching elements 15U to 15Z in the power converter 15 (this is expressed as "turn OFF all inverters" in FIG. 14). As a result, the power converter 15 operates as a full-wave rectifier circuit composed of a bridge circuit of six diodes. Then, the process proceeds to Step S1430.

At Step S1430, the controller 13 monitors the output waveform of the phase voltage generated at least any single phase among the U-phase coil 11U, the V-phase coil 11V, and the W-phase coil 11W, thereby detecting the zero-crossing point of the waveform. Subsequently, the process proceeds to Step S1440. At Step S1440, the controller 13 compares the correlation relationship between the generation timing of the zero-crossing point detected at Step S1430 and the output from the rotation angle sensor 17 (the generation timing of the passage pulse) with the correlation relationship in the ideal state such as that described above (theoretical values or demonstrated values of a master product: stored in the ROM or a backup RAM in advance). As a result, correction is performed between the rotation phase detection value based on the output from the rotation angle sensor 17 and the actual rotation phase when the control angle is "0° CA".

A more accurate phase control is actualized by the correction shown in FIG. 14 being performed before the other corrections described above.

REFERENCE SIGNS LIST 10 alternating current generation system
11 alternating current generator
13 controller
14 driver
15 power converter
15U switching element
15V switching element
15W switching element
15X switching element
15Y switching element
15Z switching element
16 ECU
17 rotation angle sensor
111 stator
113 winding
114 rotor
115 yoke
115a outer circumferential surface
116 detection subject portion
117 magnetized portion
118a first identification portion
118b second identification portion

What is claimed is:
1. An alternating current generation system comprising:
an alternating current generator that includes
a rotor that has a plurality of magnetized portions arrayed along a circumferential direction of the rotor, the magnetized portions comprising magnetic poles, where orientations of two mutually adjacent magnetic poles alternate in the circumferential direction, the two mutually adjacent magnetic poles providing reversal positions of the magnetic poles in the circumferential direction, and a stator that has a plurality of windings configuring a plurality of phases and arrayed in order of phase along the circumferential direction, wherein
the rotor includes a first identification portion and a second identification portion which are formed by the rotor, the first identification portion being formed by a plurality of detection subject portions arrayed on a surface of the rotor along the circumferential direction in correspondence to reversal states of magnetic poles of the plurality of magnetized portions, the second identification portion being formed by providing no detection subject portions on the surface of the rotor,
the detection subject portions are provided such that a straight line drawn from a rotation center axis of the rotor towards each of the reversal positions of the magnetic poles passes a center of each of the detection subject portions in the circumferential direction, and
the detection subject portions include a plurality of detection subject portions each positioned to be opposed to a corresponding one of the reversal positions of the magnetic poles in a radial direction of the rotor;
a power converter that includes a plurality of switching elements capable of being driven ON/OFF, the quantity of which corresponds to the number of phases in the alternating current generator, and that bi-directionally converts power between an alternating current and a direct current by driving ON/OFF the plurality of switching elements, and is connected to the plurality of windings in the alternating current generator so as to transmit and receive power to and from the alternating current generator;
a detecting unit that is disposed opposing the rotor so as to generate an output signal corresponding to passage of the detection subject portions; and
a phase control unit that outputs, to the power converter, a control signal to control the phase of the ON/OFF driving of the switching elements based on information on the rotation phase of the rotor based on the output signal from the detecting unit.

2. The alternating current generation system according to claim 1, wherein:
the phase control unit is configured to correct the phase control through i) detection of a peak characteristic of an output generated by the alternating current generator and ii) updating a map in which correction values for the phase control are stored, in response to a change in a predetermined amount of control angle for the phase control.

3. The alternating current generation system according to claim 2, wherein:
the detecting unit is configured to be used in ignition control in an internal combustion engine.

4. The alternating current generation system according to claim 2, further comprising:
a separate detecting unit that magnetically detects the reversal positions.

5. The alternating current generation system according to claim 1, wherein:
the phase control unit includes
a rectification operation control means for performing only a full-wave rectification operation with the transistor operations of the switching elements in the power converter turned OFF, in an operating state in which the rotation frequency of the rotor is low,
a monitoring means for monitoring an output voltage waveform of at least a single phase among the windings during the full-wave rectification operation, and
a correcting means for correcting phase control based on a zero-crossing point of the output voltage waveform and the output signal from the detecting unit.

6. The alternating current generation system according to claim 5, wherein:
the detecting unit is configured to be used in ignition control in an internal combustion engine.

7. The alternating current generation system according to claim 5, further comprising:
a separate detecting unit that magnetically detects the reversal positions.

8. The alternating current generation system according to claim 1, wherein:
the detecting unit is configured to be used in ignition control in an internal combustion engine.

9. The alternating current generation system according to claim 8, further comprising:
a separate detecting unit that magnetically detects the reversal positions.

10. The alternating current generation system according to claim 1, wherein:
each of the detection subject portions is formed into a tooth-shaped portion that protrudes from the surface of the rotor, and
the second identification portion is an untoothed portion formed by excluding the tooth-shaped portions on the surface of the rotor.

11. The alternating current generation system according to claim 10, wherein:
the phase control unit is configured to correct the information on the rotation phase serving as reference for phase control based on an actual output of the alternating current generator and a predetermined reference value.

12. The alternating current generation system according to claim 11, wherein:
the phase control unit is configured to correct the phase control through i) detection of a peak characteristic of an output generated by the alternating current generator and ii) updating a map in which correction values for the phase control are stored, in response to a change in a predetermined amount of control angle for the phase control, and correct.

13. The alternating current generation system according to claim 11, wherein:
the detecting unit is configured to be used in ignition control in an internal combustion engine.

14. The alternating current generation system according to claim 11, further comprising:
a separate detecting unit that magnetically detects the reversal positions.

15. The alternating current generation system according to claim 10, further comprising:
a separate detecting unit that magnetically detects the reversal positions.

16. The alternating current generation system according to claim 10, wherein:
the untoothed portion has a circumferential length produced by excluding at least one tooth-shaped portion on the surface of the rotor.

17. The alternating current generation system according to claim 16, wherein:

the rotor comprises a yoke which has a radially outer surface, the tooth-shaped portions are arrayed at intervals on the radially outer surface in the circumferential direction, and the untoothed portion is located between both end portions of an array of the tooth-shaped portions in the circumferential direction.

18. The alternating current generation system according to claim 1, comprising a further control unit configured to perform a predetermined control process based on the output signal from the detecting unit, the predetermined control process including ignition control or fuel injection control in an internal combustion engine mounted in a vehicle on which the alternating current generation system is mounted.

* * * * *

UNITED STATES PATENT AND TRADEMARK OFFICE
CERTIFICATE OF CORRECTION

PATENT NO.        : 9,685,893 B2                                  Page 1 of 1
APPLICATION NO.   : 14/646941
DATED             : June 20, 2017
INVENTOR(S)       : Fuwa et al.

It is certified that error appears in the above-identified patent and that said Letters Patent is hereby corrected as shown below:

In the Claims

At Column 16, Line 48, Claim 12:
Change "control, and correct." to --control.--

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*